US008233394B2

(12) United States Patent (10) Patent No.: US 8,233,394 B2
Sendra Alcina et al. (45) Date of Patent: Jul. 31, 2012

(54) METHOD FOR PREVENTING OVERLOAD IN MOBILE TELEPHONE NETWORKS BY USING 'ALWAYS-ON' IN THE CASE OF INCOMING CALLS

(75) Inventors: Jose Carlos Sendra Alcina, Madrid (ES); Miguel Angel Touset Rios, Madrid (ES)

(73) Assignees: Vodafone Group PLC, Newbury, Berkshire (GB); Vodafone Espana, S.A., Alcobendas, Madrid (ES)

( * ) Notice: Subject to any disclaimer, the term of this patent is extended or adjusted under 35 U.S.C. 154(b) by 120 days.

(21) Appl. No.: 12/594,813

(22) PCT Filed: Apr. 3, 2008

(86) PCT No.: PCT/ES2008/000202
§ 371 (c)(1),
(2), (4) Date: Apr. 29, 2010

(87) PCT Pub. No.: WO2008/119860
PCT Pub. Date: Oct. 9, 2008

(65) Prior Publication Data
US 2010/0214924 A1 Aug. 26, 2010

(30) Foreign Application Priority Data
Apr. 3, 2007 (ES) .................................. 200700881

(51) Int. Cl.
*H04J 1/16* (2006.01)
(52) U.S. Cl. ........................................ 370/235; 370/229
(58) Field of Classification Search .................. 370/230, 370/229, 235, 236, 232, 310, 331, 349, 328, 370/352, 338, 395.21, 395.2, 401, 431; 455/404.1, 455/406, 413, 416, 418, 415, 425, 435.1, 455/466; 709/226, 227, 206, 228, 217, 233, 709/238
See application file for complete search history.

(56) References Cited

U.S. PATENT DOCUMENTS
7,787,858 B2 * 8/2010 Koskinen et al. ............. 455/405
(Continued)

FOREIGN PATENT DOCUMENTS
WO 2007/022791 3/2007

OTHER PUBLICATIONS

3GPP: "3GPP TS 23.228 V7.7.0 (Mar. 2007) 3rd Generation Partnership Project; Technical Specification Group Services and System Aspects; IP Multimedia Subsystem (IMS); Stage 2 (Release 7)" [Online] Mar. 2007, XP002496281, Retrieved from the Internet: URL:hhtp://www.3gpp.org/ftp/Specs/html-info/23228.htm> [retrieved on Sep. 17, 2008].

(Continued)

*Primary Examiner* — Aung S Moe
*Assistant Examiner* — Abdullah Riyami
(74) *Attorney, Agent, or Firm* — Workman Nydegger

(57) ABSTRACT

A method for preventing overload in telecommunications networks with IMS by always-on for a call received by a user. The user sends a request message in order to activate a new PDP Context to his SGSN, which sends it to a GGSN. The GGSN sends an Accounting Request message to an AAA server. If the GGSN is going to deactivate the user PDP Context for having been inactive, the association is not eliminated from an AAA server in which this association has been saved and, when an incoming call is received: the status of the user PDP Context is verified by an indicator, and if it is not active, the PDP Context is reactivated, and if the IP address has not been assigned to another user, an attempt is made to reactivate the PDP Context; and if said IP address has already been assigned, a restart is carried out after the failure of the call.

5 Claims, 1 Drawing Sheet

U.S. PATENT DOCUMENTS

| | | |
|---|---|---|
| 2003/0220900 A1 | 11/2003 | Gabor |
| 2005/0117591 A1* | 6/2005 | Hurtta et al. .................. 370/401 |
| 2005/0238002 A1* | 10/2005 | Rasanen ....................... 370/352 |
| 2006/0045071 A1 | 3/2006 | Vimpari et al. |
| 2006/0140149 A1* | 6/2006 | Kim et al. ..................... 370/331 |
| 2006/0165059 A1* | 7/2006 | Batni et al. .................... 370/352 |
| 2006/0174009 A1* | 8/2006 | Martiquet et al. ............ 709/227 |
| 2008/0192733 A1* | 8/2008 | Song et al. .................... 370/352 |
| 2008/0198861 A1* | 8/2008 | Makela ......................... 370/401 |
| 2008/0205379 A1* | 8/2008 | Naqvi ........................... 370/352 |
| 2008/0259887 A1* | 10/2008 | Naqvi ........................... 370/338 |
| 2009/0247137 A1* | 10/2009 | Awad ............................ 455/418 |
| 2009/0296630 A1* | 12/2009 | Chen et al. .................... 370/328 |

OTHER PUBLICATIONS

3GPP TS 23.060 V3.5.0, $3^{rd}$ Generation Partnership Project; Technical Specification Group Services and System Aspects; General Packet Radio Service (GPRS); Service description; Stage 2, 181 pages, 2000.

U.S. Appl. No. 12/594,811 dated May 25, 2010, Sendra Alcina et al.

* cited by examiner

METHOD FOR PREVENTING OVERLOAD IN MOBILE TELEPHONE NETWORKS BY USING 'ALWAYS-ON' IN THE CASE OF INCOMING CALLS

FIELD OF THE INVENTION

The invention is comprised within the field of mobile telecommunications, and more specifically in how static overload in SGSN and GGSN can be prevented when PDP Context with always-on needs are required for real time services such as IMS.

BACKGROUND OF THE INVENTION

It is known that abbreviations and acronyms are frequently used in the mobile telephony field. A glossary of acronyms/terms which are used throughout the present specification is set forth below:

| | |
|---|---|
| APN | Access Point Name |
| CS | Circuit Switching |
| GGSN | Gateway GPRS Support Node |
| GPRS | General Packet Radio Service |
| GTP | GPRS Tunneling Protocol |
| HLR | Home Location Register |
| IMS | IP Multimedia Subsystem |
| IMSI | International Mobile Subscriber Identity |
| MSISDN | Mobile Subscriber Integrated Services Digital Number |
| MT | Mobile Terminated |
| P-CSCF | Proxy Call Session Control Function |
| PDP | Packet Data Protocol |
| PS | Packet Switching |
| RADIUS | Remote Authentication Dial In User Service |
| S-CSCF | Serving Call Session Control Function |
| SGSN | Serving GPRS Support Node |
| U/SIM | Subscriber Identity Module |
| SIP | Session Initiation Protocol |
| UMTS | Universal Mobile Telecommunications System |

Always-on is an old and well known problem in the PS environment. Theoretically, any user who executes a PDP Context Request (makes a request for a new context) and receives a positive response, is using IP resources in an always-on manner, i.e. always present and assigned, even if the user does not generate any IP data traffic. The type of resources used has more of a static character (IP address, memory load in the nodes, etc.) than a dynamic character (radio channels, etc.), however even so it is a question of scarce resources. In fact current GGSNs are configured to close any PDP Context without activity for the purpose of saving the maximum number of resources as possible. The element defining which inactive PDP must be closed is the APN with which the access is carried out.

When the IMS system is adopted on a large scale, it is possible that a paradoxical situation occurs. The use of the IMS for real time services implies an assumption of total reachability of the user at any time and in any place, with a view to maintaining the same level of service which the user currently has with CS. That means that the PDP Context for SIP signaling used by the user must always be available (from the IMS point of view, closing the signaling context means deregistering the user de facto), even if the inactivity of the user is extended for a long time. Therefore the IMS requirements will only worsen the problem of consuming IP resources without actual associated traffic.

Before explaining the proposed solution to this problem by means of the present invention, what would occur with the current situation is described below. It is assumed that there is an IMS user already registered in the system and with active signaling context, therefore he or she is capable of initiating and receiving calls. If the GGSN decides to close that signaling PDP Context because the user has not carried out any additional interaction with the network, the user would pass to a status similar to that of deregistered, being unable to initiate or receive any call until requesting a new context and registering again in the system. This implies additional signaling and furthermore the expected delay upon setting up any type of call increases.

DESCRIPTION OF THE INVENTION

The use of the resources which the always-on model will impose on the PS infrastructure when the IMS is adopted is lightened by means of the method of the present invention.

The proposed invention is based on the concept of layer separation, which means breaking the dependence between what occurs to the PDP Context and the status of the user in the IMS network.

The invention relates to a method for preventing overload in telecommunications networks with IMS by always-on for a call received by a user;

According to a first aspect of the invention:

said user sends a request message in order to activate a new PDP Context to his or her SGSN, which sends it to a GGSN;

the GGSN sends an Accounting Request message to an AAA server, further including in the 3GPP Vendor Attributes field of said Accounting Request message, the GGSN and SGSN IP addresses in which said user is located; and if the GGSN is going to deactivate said PDP Context for having been inactive for a preestablished period of time, said association [user IP address, GGSN IP address, SGSN IP address] in the AAA server is not eliminated, and furthermore the GGSN informs the P-CSCF in which said user is present, the P-CSCF adding an indicator describing that said user is registered in IMS but without an active PDP Context; and, when an incoming call is received:

an S-CSCF of the network sends a PDP Context request to the P-CSCF in which said user is present;

said P-CSCF verifies the status of the user PDP Context using said indicator, and if the PDP Context is not active, said PDP Context is activated again for which the P-CSCF informs the GGSN about the IP address which must be assigned to said user, and if said IP address of the association has not been assigned by the GGSN to another user, an attempt is made to reactivate the PDP Context using the address given by the P-CSCF for which the GGSN uses the Network-Requested PDP context activation procedure, an Access-Request consultation to the AAA server using that IP address as the main consultation parameter being necessary;

the AAA server uses said IP address as an index and responds to the GGSN using an Access-Accept message with the SGSN IP address under which the user is located;

and if said IP address has been assigned to another user, a restart is carried out after the failure of the call attempt.

Preferably and in order to prevent insofar as it is possible that the IP address has been assigned to another user, in the GGSN, when an IP address is freed it is saved in the last position of an IP address line.

Preferably and in order to detect if the user receiving the incoming call has moved from the time of the deactivation of the PDP Context, therefore changing the service SGSN:

the AAA server consults the corresponding HSS/HLR using the Accounting-Request-START message, before responding to the GGSN with the Access-Accept message, including the SGSN address which the AAA server currently has saved among other related IMSI/MSISDN parameters;

if the SGSN address saved in the HSS/HLR differs from that sent in that message for the reported IMSI/MSIDN, the HSS/HLR responds with an Accounting-Response-START updating said SGSN address;

and this information is transferred to the GGSN in the Access-Accept message.

According to this preferred embodiment, an interposition of the Accounting procedure is demanded before closing the Access procedure, the non-standard RADIUS behavior of which is indicated to the AAA server by means of a parameter in a field of the message initiating the Access-Request protocol.

The method can also comprise that:

the AAA server indicates to the corresponding HSS/HLR for which user or users it needs information about their respective SGSNs, and the HSS/HLR, whenever a modification occurs of the SGSN address which it has saved for that user or those users, informs the AAA server of said update of the SGSN address.

Therefore a solution to the situation previously set forth is provided by means of the present invention, fulfilling the following objectives:

The network continues to be able to close largely inactive PDP Context.

The user can be reached for any real time incoming call.

The solution minimizes the necessary signaling.

The solution does not require new developments or adoption of new elements in the architecture. In fact, the use of protocols and functionalities currently implemented or expected to be incorporated to the network in the near future is desirable.

BRIEF DESCRIPTION OF THE DRAWINGS

A series of drawings will be very briefly described below which aid in better understanding the invention and are presented as illustrative but non-limiting examples thereof.

DESCRIPTION OF A PREFERRED EMBODIMENT OF THE INVENTION

The way to implement a solution by means of the method of the invention is described below for the following cases: mobile terminated call (MT case).

It is convenient to understand the IMS terminal as an entity formed by two elements: the actual UMTS terminal and the IMS client (with the SIP stack). The IMS client is the element managing all IMS signaling and using services of the UMTS terminal (basically the PDP Context support) in order to provide suitable service to the user.

In the case of a call terminated in the mobile terminal, the network must force the user to pick up a new PDP Context when an incoming call is received.

Figure 1:
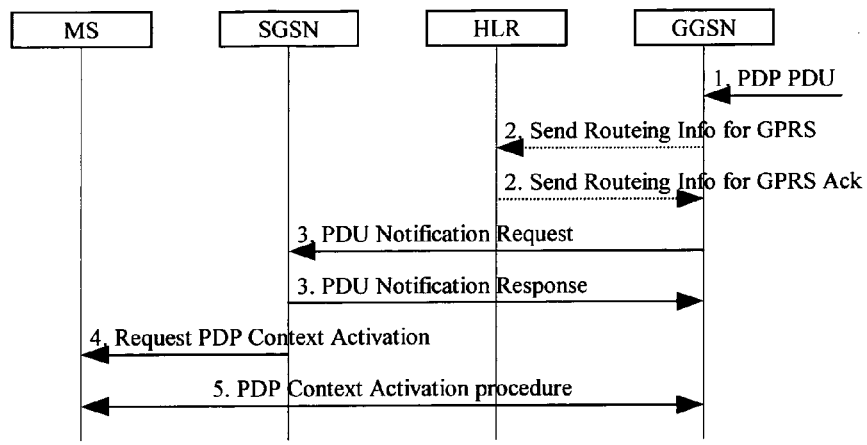
FIG. 1 shows an example of a successfully executed standard Network-Requested PDP Context Activation procedure.
Figure 2:
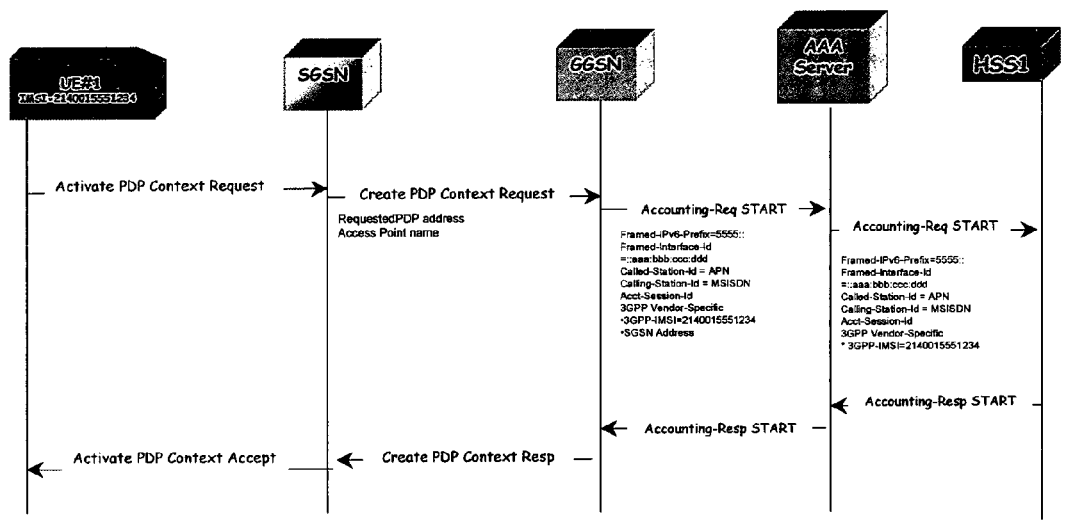
FIG. 2 shows how the IMS Interim Solution involves transferring relevant information to the always-on problem described herein

One possible way of doing this is through the procedure described in standards as Network-Requested PDP Context Activation. FIG. 1 shows an example in which a Network-Requested PDP Context Activation procedure is successfully carried out. This procedure consists of a consultation by the GGSN to the HLR in order to find the SGSN address currently responsible for the sought user. Once it has been found, a requirement is sent to the user, through the mentioned SGSN, so that he or she initiates a PDP Context, because the PDP Contexts are always initiated by the mobile.

It is useful to understand the current status of this functionality in the GPRS/UMTS networks. Up until now, the GGSNs present in real networks can initiate this type of interaction, i.e. they can create the required message for the Network-Requested PDP Context Activation using the GTP protocol. However, a necessary requirement for implementing this procedure is that the GGSN sends said message to the correct SGSN, under which this user is located. Achieving said information requires an interaction between GGSN and HLR through an interface called Gc. Although this interface, is a standard interface, it is not present in many of the real networks and its presence is not expected in the near or mid-term future.

In a first approach, an embodiment of the method of the present invention, for this case of a call terminated in the mobile terminal MT, makes use of this functionality, but overcoming these limitations which have in fact prevented the use of this method in the current GPRS/UMTS networks.

To that end, some architectural elements are used which will be implemented for the IMS deployment, except for some security problems (Interim Security Solution). In this case the use of an AAA server (authentication, authorization, and accounting server) is required for ensuring the access to the IMS user networks with SIM (not USIM) modules and old terminals (or rather, not completely adapted to the standard IMS solutions, basically without IPSec). This solution provides a lower level of security in the IMS access, but it is considered sufficient due to the fact that it prevents dangerous security threats such as IP spoofing, user impersonation, etc.

In the proposed solution, the GGSN sends an Accounting-Request message to the AAA server, informing about certain attributes of the user such as the assigned IP address, the MSISDN, etc., during the IMS Registration procedure. The GGSN also implements optional fields defined as 3GPP Vendor Attributes in said Accounting-Request message. These optional fields contain important information such as the GGSN and SGSN IP addresses, the latter being especially important in this case.

Recapping the situation: after the IMS Registration procedure using the solution described above, there is an AAA server with the user, GGSN and SGSN IP addresses which are currently providing service. According to the method of the invention, said information is not eliminated from said AAA server when the PDP Context is eliminated by the GGSN in the event of an overload and inactivity—i.e. the GGSN does not sent any Accounting-Request-STOP message to the AAA server—, because said information is used in the proposed solution to the always-on problem.

Thus, when an incoming call is received, the S-CSCF sends said request to the suitable P-CSCF, under which the requested user is assumed to be present. Said P-CSCF must check the current status of the user PDP Context, using to that end an indicator which has been added to the PDP Context list (more specifically to the IPSec Security Association list) when the GGSN informed that it was going to close said PDP Context. The meaning of said indicator therefore describes that the user is registered in IMS but has no active PDP Context. It is therefore necessary to activate said PDP Context again, having as a necessary requirement the indication to the GGSN about the IP address which must be assigned to the user, which is the same as that saved in the IMS association.

Said indication is sent by the P-CSCF to the GGSN using the interface described as Gx+. Said indication can be included in any Diameter message of said interface, or an additional message could also be defined therefor.

If the GGSN has not assigned the required IP address to another user, an attempt is made to reactivate the PDP Context using the IP address indicated by the P-CSCF. For this purpose, the GGSN will use the mentioned Network-Requested PDP Context Activation procedure, a consultation to the AAA server (Access-Request message) using the IP address as the main consultation parameter being necessary. The AAA server uses said IP address as an index and responds to the GGSN using an Access-Accept message with the SGSN IP address under which the user is located.

The described procedure can run into a problem. If the user has moved from the time of disconnecting the PDP Context, changing the service Routing Area (i.e. he or she has changed the service SGSN), how can the information relating to the service SGSN in the AAA server be updated in order to take into account this case?. The element of the network having that information relating to updated mobility is the HSS (HLR), therefore this problem can be solved by consulting this element (HSS/HLR). The procedure of the Interim Security in IMS defines the use of the RADIUS protocol between the AAA server and the HSS, therefore it is reused in the solution of this case. The idea is that the AAA server consults the HSS before responding to the GGSN with the Access-Accept message. This consultation uses the Accounting-Request-START message to the HSS, including the SGSN address which the AAA server currently has saved, among other related parameters (IMSI, MSISDN, etc.). If the SGSN address saved in the HSS/HLR differs from that sent in that message for the reported IMSI/MSIDN, the HSS/HLR must respond with an Accounting-Response-START updating said SGSN address. After this, this information is transferred to the GGSN in the Access-Accept message.

Nevertheless, the previously described behavior slightly differs from that specified in the RADIUS protocol standard. Said standard provides that the Access procedure is completed before starting the Accounting procedure. But in this case an interposition of the Accounting procedure before closing the Access procedure is being demanded from it. In short, a non-standard behavior is being demanded for a very specific case. Therefore the demand of this behavior change must be indicated to the AAA server in any field of the message initiating the protocol: the Access-Request.

The solution described here is thus, without a doubt, the most "elegant" of all possible solutions and that which allows a smaller delay in setting up calls.

The invention claimed is:

1. A method for preventing overload in telecommunications networks with IMS by always-on for a call received by a user; the method comprising:
    sending by said user a request message in order to activate a new PDP Context to his or her SGSN, which sends it to a GGSN;
    sending by the GGSN an Accounting Request message to an AAA server, further including in the 3GPP Vendor Attributes field of said Accounting Request message the GGSN and SGSN IP addresses which are providing service to said user; and
    if the GGSN is going to deactivate said PDP Context for having been inactive for a preestablished period of time, an association including user IP address, GGSN IP address, SGSN IP address in the AAA server is not eliminated, and
    furthermore the GGSN informs a P-CSCF in which said user is present, the P-CSCF adding an indicator describing that said user is registered in IMS but without an active PDP Context; and,
    when an incoming call is received:
    an S-CSCF of the network sends a PDP Context request to the P-CSCF in which said user is present;
    said P-CSCF verifies the status of the user PDP Context using said indicator, and if the PDP Context is not active, said PDP Context is activated again for which the P-CSCF informs the GGSN about the IP address which must be assigned to said user, and
    if said IP address of the association has not been assigned by the GGSN to another user, an attempt is made to reactivate the PDP Context using the address given by the P-CSCF wherein
    the GGSN uses a Network-Requested PDP context activation procedure, an Access-Request consultation to the AAA server using the IP address as the main consultation parameter being necessary;
    the AAA server uses said IP address as an index and responds to the GGSN using an Access-Accept message with the SGSN IP address under which the user is located;
    and if said IP address has been assigned to another user, a restart is carried out after the failure of the call attempt.

2. The method according to claim 1, further comprising:
    the AAA server consults a corresponding HSS/HLR using an Accounting-Request-START message, before responding to the GGSN with an Access-Accept message, including the SGSN address which the AAA server currently has saved among other related IMSI/MSISDN parameters;
    if the SGSN address saved in the HSS/HLR differs from that sent in that message for the reported IMSI/MSIDN, the HSS/HLR responds with an Accounting-Response-START updating said SGSN address;
    and this information is transferred to the GGSN in the Access-Accept message.

3. The method according to claim 2, wherein an interposition of the Accounting procedure is demanded before closing the Access procedure, the non-standard RADIUS behavior of which is indicated to the AAA server by means of a parameter in a field of the message initiating the Access-Request protocol.

4. The method according to claim 1, further comprising:
    the AAA server indicates to a corresponding HSS/HLR for which user or users it needs information about their respective SGSNs, and
    the HSS/HLR, whenever a modification occurs of the SGSN address which it has saved for the user or users, informs the AAA server of said update of the SGSN address.

5. The method according to any of the previous claims, wherein in the GGSN, when an IP address is freed, it is saved in the last position of an IP address line.

* * * * *